United States Patent Office 3,285,787
Patented Nov. 15, 1966

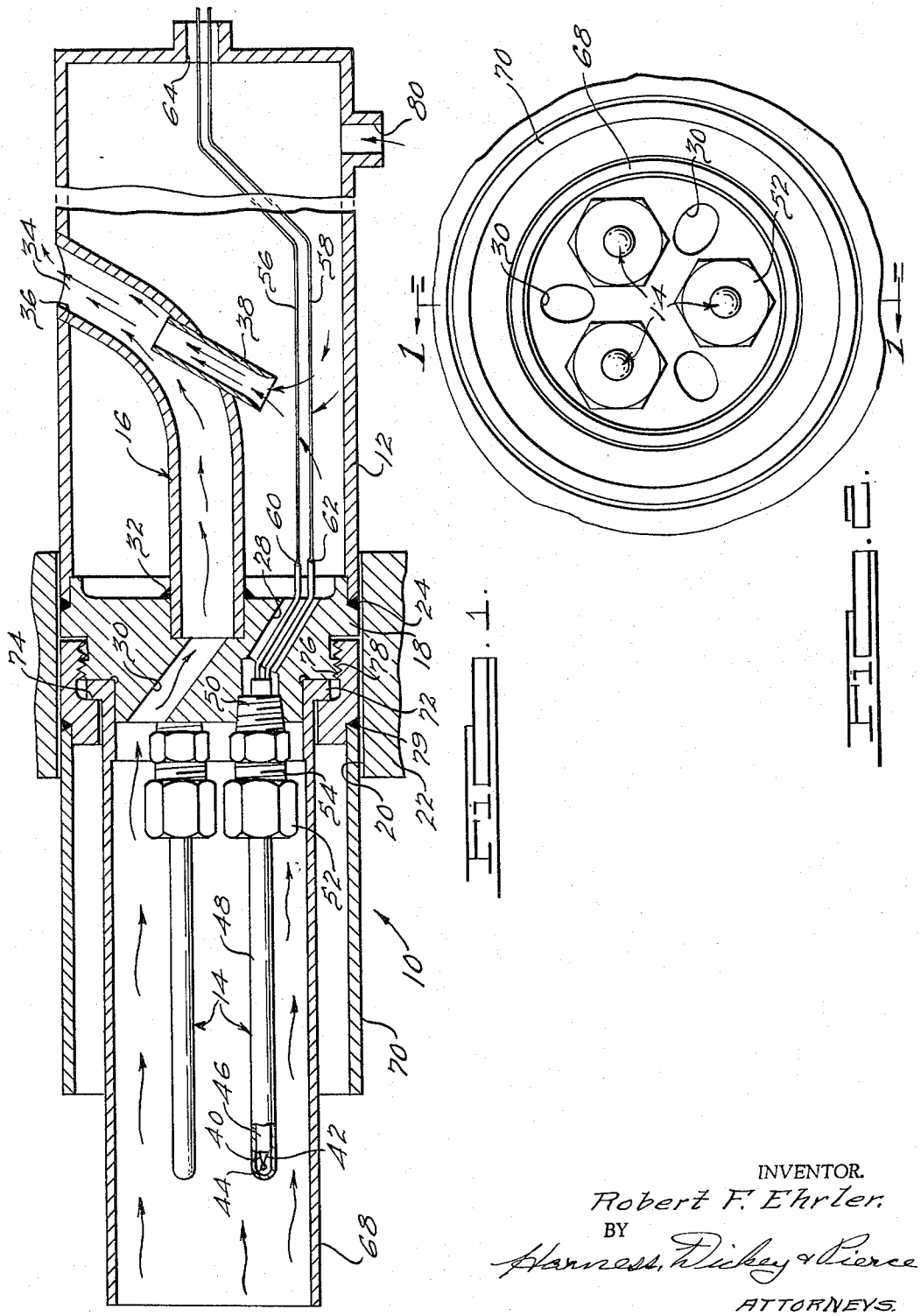

3,285,787
EDUCTION-THERMOCOUPLE WITH ASPIRATED CONDUCTORS
Robert F. Ehrler, Lancaster, Ohio, assignor to Diamond Power Specialty Corporation, Lancaster, Ohio, a corporation of Ohio
Filed Aug. 16, 1962, Ser. No. 217,467
8 Claims. (Cl. 136—231)

This invention relates to an improved thermocouple type temperature measuring device and particularly concerns improvements in the thermocouple mounting, the gas flow inducing system for high velocity thermocouples, and the probe tube cooling system thereof.

It is customary to measure relatively high temperatures such as exist in furnaces and flues of boiler installations and the like by means of one or more thermocouples disposed in a tubular housing, the end portion of which contains the thermocouple hot junction and the other portions of which provide a housing for the extension leads connecting the thermocouple leads to the reference junction and to a current responsive temperature indicating instrument. These devices are adapted for insertion through suitable ports in the furnace or flue wall to make temperature determinations at various locations therein. It is also customary to provide some means for cooling the probe tubes and the extension leads therein to prevent them from deterioration by the high temperatures transmitted thereto when the device is inserted through the furnace wall into the furnace, and also to maintain a substantially constant temperature at the connections of the extension leads with the thermocouple leads to minimize errors in temperature readings. Also, according to previous practice some type of aspirating means is usually employed for providing a pressure drop across the thermocouple hot junction and its protecting sheath so that the hot furnace gases may be drawn past the junction to improve the heat transfer thereto and produce thereby a more accurate temperature reading; this type of thermocouple is known as an HVT or high velocity thermocouple. These previously used cooling and aspirating means, however, have not been entirely satisfactory in that they usually require separate exterior sources for the cooling and aspirating media and as a result increase the cost, weight and complexity of the device.

An additional drawback to the prior aspirating means is that their relative complexity and sometimes tortuous gas passages allow them to become easily clogged by the rather heavy soot and dust often carried by the furnace gases. When this occurs, the effectiveness of the device is of course greatly diminished.

The principal objects of the present invention, therefore, are to provide in an HVT type of temperature measuring device simplified means for drawing the furnace gases past the thermocouple hot junction and for cooling portions of the thermocouple device; to reduce the tendency of the dust laden furnace gases to clog the passage means through which the furnace gases are drawn after they have come into intimate contact with the thermocouple hot junction; to simplify the thermocouple construction in order to reduce its manufacturing and servicing costs and to provide a more efficient temperature measuring instrument, and to provide the device with such construction that it is a compact, self-contained unit wherein the thermocouples are readily accessible for maintenance, repair and replacement.

Further objects, advantages and novel features of the invention will become apparent from the following description, claims and drawings wherein:

FIGURE 1 is a longitudinal cross-sectional view of the device with portions broken away, taken along the line 1—1 of FIGURE 2; and FIGURE 2 is a left-hand end view of the device of FIGURE 1.

In the drawings, the temperature measuring device generally indicated at 10 comprises an elongated housing or probe tube 12, a plurality of thermocouples each indicated at 14, an eduction conduit 16, and a partition wall 18. Housing 12 may be made to any desired length depending on how far the thermocouples are to be inserted into the furnace through the inspection port 20 in the wall 22 thereof. This inspection port may be closed by means of a suitable door (not shown) after the temperature measurements have been made. Housing 12 is welded at 24 to wall 18 which is provided with three thermocouple lead passages 28 and three inclined gas flow passages 30, as seen in FIGURE 2. The entrance of eduction conduit 16 extends into and is welded to the central region of wall 18 at 32, being connected to the converging exits of passages 30. The exit 34 of conduit 16 extends through an aperture 36 in housing 12 to thus connect passages 30 with the atmosphere or some form of gas receiver. A tubular aspirating member 38 of narrower diameter than conduit 16 is inserted through an aperture in the wall of conduit 16 at such an angle that the axis of member 38 substantially corresponds to the axis of exit portion 34 of conduit 16. Member 38 is thus in eductive relation with that portion of conduit 16 extending to it from wall 18.

The temperature sensing thermocouples 14, any suitable number of which may be employed, are largely of conventional construction and each comprises a pair of junction wires 40 and 42 joined at 44, the junction being of any type well-known to the art. The junction wires 40 and 42 are separated by and extend through insulating material 46 capsulated by a protective ceramic or alloy tube 48. Tube 48 is connected to and supported in the partition wall 18 by means of a fitting 50 threaded therein and a nut 52 threaded onto portion 54 of the fitting so that tightening of the nut on the fitting tends to contract portion 54 about tube 48 to fixedly retain the thermocouple wires, insulators and the protective tube in proper position. The wires 40 and 42 with suitable high temperature insulation thereon extend from the rear end of the tube 48 and are connected to the insulated extension leads 56 and 58 at 60 and 62, respectively. These extension leads extend outwardly through an opening 64 in the housing and are connected to a current responsive temperature indicating instrument which, for example, may have a selector switch operatively connected in the thermocouple circuit so that each of the three thermocouples 14 may be selectively read. It is noted that many types of electrical circuits for the remote reading of thermocouples are well-known to those skilled in the art. The wires 40 and 42 may be of any suitable type depending among other factors upon the particular temperatures to be measured and the chemical activity of the furnace gases. For example, increasing temperatures may be measured by use of the following types of thermocouple lead pairs set forth in the order of increasing temperature use: copper to constantan; iron to constantan; Chromel to Alumel; and 90% platinum-10% rhodium to platinum.

In order to reduce radiation loss between the thermocouples and the furnace wall, which loss could be quite significant at higher temperatures, inner and outer radiation shields 68 and 70 are provided. Shield 68 is formed with a flange 72 which is engaged by flange 74 of the outer shield as the threaded portion 76 thereof is threaded onto the threaded portion 78 of wall 18. Shield 70 may be formed in two sections and welded as shown at 79.

In the operation of the device, the thermocouples, shields and probe tube or housing 12 are inserted through the inspection port 20 in the furnace wall to position the thermocouples at the desired position in the furnace. Air under pressure is then supplied through a port 80 in the housing and flows through the housing and around the extension leads 56 and 58 and connections 60 and 62 to maintain the housing, leads and connections at relatively cool and substantially uniform temperatures regardless of the position of the housing within the furnace. In the illustrated embodiment, the gases emanating from exit 34 of conduit 16 will enter the furnace if probe tube 12 has been inserted a sufficient distance. Alternatively, the outlet 34 of conduit 16 could be extended through the wall of probe tube 12 further to the right than that shown in the drawing to always provide an outlet for the gases outside the furnace. The pressurized air flowing through aspirating member 38 as a high velocity air jet causes a pressure drop in conduit 16 adjacent the outlet of member 38 which draws the furnace gases through the inner radiation shield 68 and past the thermocouples into conduit 16 from which they pass to the atmosphere through outlet 34. It is noted that passages 30 and conduit 16 are of sufficient size and are of such configuration as to inhibit the rapid buildup of soot and dust deposits which frequently prematurely render conventional aspirating devices ineffective. After the temperatures have been taken, the device is retracted from the furnace and port 20 closed.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a temperature measuring device having at least one thermocouple, housing means receiving electrical conductor portions of said thermocouple and providing cooling passage means therefor, and conduit means communicating with said passage means and said thermocouple for receiving aspirating fluid from said passage means to draw hot gases past said thermocouple, said conduit means including an eduction conduit for hot gases leading from said thermocouple and an aspirating conduit leading from said cooling passage means to the interior of said eduction conduit and in eductive relation therewith.

2. In a temperature measuring device having at least one thermocouple, housing means receiving electrical conductor portions of said thermocouple and providing cooling passage means therefor, a source of pressurized air connected to said passage means, and conduit means communicating with said passage means and said thermocouple receiving aspirating air from said passage means and said thermocouple receiving aspirating air from said passage means to draw hot gases past said thermocouple, said conduit means including an eduction conduit for hot gases leading from said thermocouple and an aspirating conduit leading from said cooling passage means to the interior of said eduction conduit and in eductive relation therewith.

3. In a temperature measuring device having at least one thermocouple adjacent the end of tubular housing means, said housing means receiving electrical conductor portions of said thermocouple and providing cooling passage means therefor, a source of pressurized air connected to said passage means, and conduit means communicating with said passage means and said thermocouple for receiving aspirating air from said passage means to draw hot gases past said thermocouple, said conduit means including an eduction conduit for hot gases leading from said thermocouple and an aspirating conduit leading from said cooling passage means to the interior of said eduction conduit and in eductive relation therewith.

4. In a temperature measuring device having at least one thermocouple, housing means receiving electrical conductor portions of said thermocouple and providing cooling passage means therefor, and conduit means communicating with said passage means and said thermocouple for receiving cooling fluid from said passage means and hot gases from the vicinity of said thermocouple, said conduit means including an eduction conduit for hot gases leading from said thermocouple and an aspirating conduit leading from said cooling passage means to the interior of said eduction conduit and in eductive relation therewith.

5. In a temperature measuring device, a thermocouple, a shield surrounding said thermocouple and having an open entrance end adapted to receive air the temperature of which is to be measured, a wall at the exit end of said shield, a probe tube extending from said wall away from said thermocouple and shield, an eduction conduit having an entrace end connected through said wall with the interior of said shield, means for supplying compressed cooling air to said probe tube, and an aspirating passage extending from the interior of said probe tube to the interior of said eduction conduit and in eductive relation therewith, whereby compressed cooling air flowing from the interior of said probe tube through said aspirating passage will draw gases past said thermocouple.

6. In a temperature measuring device, a thermocouple, a shield surrounding said thermocouple and having an open entrance end adapted to receive air the temperature of which is to be measured, a wall at the exit end of said shield, a probe tube extending from said wall away from said thermocouple and shield, an eduction conduit having an entrance end connected through said wall with the interior of said shield, the exit end of said eduction conduit leading through the wall of said probe tube, means for supplying compressed cooling air to said probe tube, and an aspirating passage extending from the interior of said probe tube to the interior of said eduction conduit and in eductive relation therewith, whereby compressed cooling air flowing from the interior of said probe tube through said aspirating passage will draw gases past said thermocouple.

7. In a temperature measuring device, a thermocouple, a shield surrounding said thermocouple and having an open entrance end adapted to receive air the temperature of which is to be measured, a wall at the exit end of said shield, a probe tube extending from said wall away from said thermocouple and shield, electrical conductors within said probe tube and connected to said thermocouple, an eduction conduit having an entrance end connected through said wall with the interior of said shield, the exit end of said eduction conduit leading through the wall of said probe tube, means for supplying compressed cooling air to said probe tube, and an aspirating passage extending from the interior of said probe tube to the interior of said eduction conduit and in eductive relation therewith, whereby compressed cooling air flowing from the interior of said probe tube through said aspirating passage will draw gases past said thermocouple.

8. In a temperature measuring device, a thermocouple, a shield surrounding said thermocouple and having an open entrance end adapted to receive air the temperature of which is to be measured, a wall at the exit end of said shield, a probe tube extending from said wall away from said thermocouple and shield, an eduction conduit having an entrance end connected through said wall with the interior of said shield, the exit end of said eduction conduit leading through the wall of said probe tube, and an aspirating member extending through the wall of said eduction conduit and pointing toward the exit end thereof, said aspirating member being in eductive relation with said eduction conduit whereby compressed cooling air flowing from said probe tube through said aspirating member toward the exit end of said eduction conduit will draw gases through said shield and past said thermocouple.

References Cited by the Examiner

UNITED STATES PATENTS

| | | | |
|---|---|---|---|
| 1,615,451 | 1/1927 | Harrison | 136—4.75 |
| 2,006,469 | 7/1935 | Lucke | 136—4.51 |
| 2,534,448 | 12/1950 | Jantsch | 136—4.75 X |
| 2,669,593 | 2/1954 | Larsen | 136—4.5 |
| 2,833,844 | 5/1958 | Burton et al. | 136—4 |

OTHER REFERENCES

Hawthorne, W.R., "Gas Temperature Measurement in Boilers." In, Institute of Fuel Journal, vol. 12, March 1939, pp. S64–8.

Mullikin, H. F., "Gas-Temperature Measurement and the High-Velocity Thermocouple." In "Temperature, Its Measurement and Control in Science and Industry," Am. Inst. Physics, Reinhold Pub. Co. (1941), pp. 775–804.

WINSTON A. DOUGLAS, *Primary Examiner.*

JOHN H. MACK, *Examiner.*

A. M. BEKELMAN, *Assistant Examiner.*